United States Patent [19]

Taylor et al.

[11] 4,142,138
[45] Feb. 27, 1979

[54] MOTOR CONTROL

[75] Inventors: David C. Taylor, Carmel, N.Y.; Mark W. Hayden, Stratford, Conn.

[73] Assignee: E. I. Du Pont de Nemours and Company, Wilmington, Del.

[21] Appl. No.: 792,709

[22] Filed: May 2, 1977

[51] Int. Cl.² .................................. H01R 39/43
[52] U.S. Cl. .................. 318/542; 318/361; 318/429; 318/541
[58] Field of Search .......... 318/361, 429, 541, 542, 318/397, 398; 310/240

[56] References Cited
U.S. PATENT DOCUMENTS
3,867,679   2/1975   Smith ................. 318/361

Primary Examiner—Robert K. Schaefer
Assistant Examiner—Eugene S. Indyk

[57] ABSTRACT

An apparatus and a method is described for smoothing the acceleration and deceleration of an electric motor. This is accomplished by using a pair of brush springs (strong and weak) for each brush of an electric motor. At low speeds, the strong spring is retracted so that the force with which the brush is applied to the motor commutator is greatly reduced. This reduced frictional force improves the smoothness of the acceleration and deceleration characteristics of the motor at low speeds.

6 Claims, 3 Drawing Figures

MOTOR CONTROL

BACKGROUND OF THE INVENTION

This invention relates to an apparatus and a method for smoothing the acceleration and deceleration characteristics of an electric motor and, more particularly, to an apparatus and a method for reducing the brush pressure against the commutator of an electric motor during low speed operation.

In many fields, particularly the field of centrifugation, it is desirable that the electric motor used to drive an apparatus has smooth acceleration and deceleration characteristics at low speeds. This problem is particularly acute in centrifuging materials. For example, in density gradient separations, fluids of different densities are placed in layers, with the highest density fluid forming the bottom layer, in a test tube. Particles to be separated are placed on top of the fluid layers. The test tube is then placed in a centrifuge and the particles subjected to centrifugal force.

If the acceleration of the rotor is uneven, the separation between the several density layers will be disturbed with the result that fractionation of the particles may not be as precise as desired. Similarly, as the density gradient is decelerated following separation, particularly as the lower speeds are approached, the same discontinuities and abrupt stops can distort the gradient, i.e., mix the density layers and reduce the precision of the fractionation. Also, if the rate of acceleration and/or deceleration is too high, particularly at low speeds, similar distortions of the separation between density layers can occur.

Similar problems can arise in most types of centrifugation work, whether it be using swinging-buckets, angle rotors, vertical rotors or even continuous centrifuges. In all of these cases, the fractionation or separation of the components can be hampered both during starting and stopping of the centrifuge rotor if the acceleration and deceleration is uneven, too great, irregular or discontinuous.

These problems encountered during acceleration and deceleration at low speeds are brought about typically because of the use of brush type electric motors. No matter how much care is taken in building a motor's commutator, it is never precisely round and there are, of course, gaps or discontinuities between commutator segments. To maintain proper brush contact at operating speeds, relatively high forces are applied to the brushes. Unfortunately at low speeds, typically below 1000 revolutions per minute (rpm), this high brush force causes the rotor to pulsate or turn irregularly. In fact, the motor may be brought to an abrupt stop by the brushes "hanging up" on a particular commutator segment or gap. There is another similar effect caused by variation in the electrical current through the motor known as magnetic cogging. This effect, however, is relatively insignificant in comparison to the frictional effects.

It is known in the prior art to provide an apparatus for totally lifting the brushes from contact with the commutator to provide a long term friction-free coasting. Patents that are descriptive of this type technique are U.S. Pat. Nos. 3,278,777 and 2,128,598. While the teaching of these patents, if applied to the problem at hand would alleviate to some extent the deceleration problem, they would not be at all useful for solving the acceleration problem since they could not contact the commutator and hence could not apply power to the motor.

It is therefore an object of this invention to obviate many of the vagaries inherent in the prior art brush type electric motor acceleration and deceleration characteristics.

Another object of this invention is to provide an improved apparatus for smoothing the acceleration and deceleration characteristics of brush type electric motors, particularly at low speeds.

SUMMARY OF THE INVENTION

In this invention, an apparatus is provided for smoothing the acceleration and deceleration characteristics of an electric motor having a commutator and an associated brush and brush holder. The apparatus includes a first means for urging the brush against the commutator with a force of a first value, and adjusting means associated with the first means for adjusting the force to a second value less than the first value.

It is desirable to include a means responsive to the speed of the motor being less than the predetermined value for actuating the adjusting means to reduce the force from the first value to the second value. In a particularly preferred embodiment, the first means includes a first spring having a first spring constant and a second spring having a second spring constant that is less than the first spring constant. The adjusting means acts to prevent the first spring from urging the brush against the commutator. This leaves only the lower relatively weak pressure provided by the second spring to urge the brush against the commutator. This reduces the friction of the brush on the commutator thereby smoothing the acceleration and deceleration characteristics of the motor.

BRIEF DESCRIPTION OF THE DRAWINGS

Further advantages and features of this invention will become apparent upon consideration of the drawings wherein.

DETAILED DESCRIPTION OF THE PREFERRED EMBODIMENTS

Figure 1:
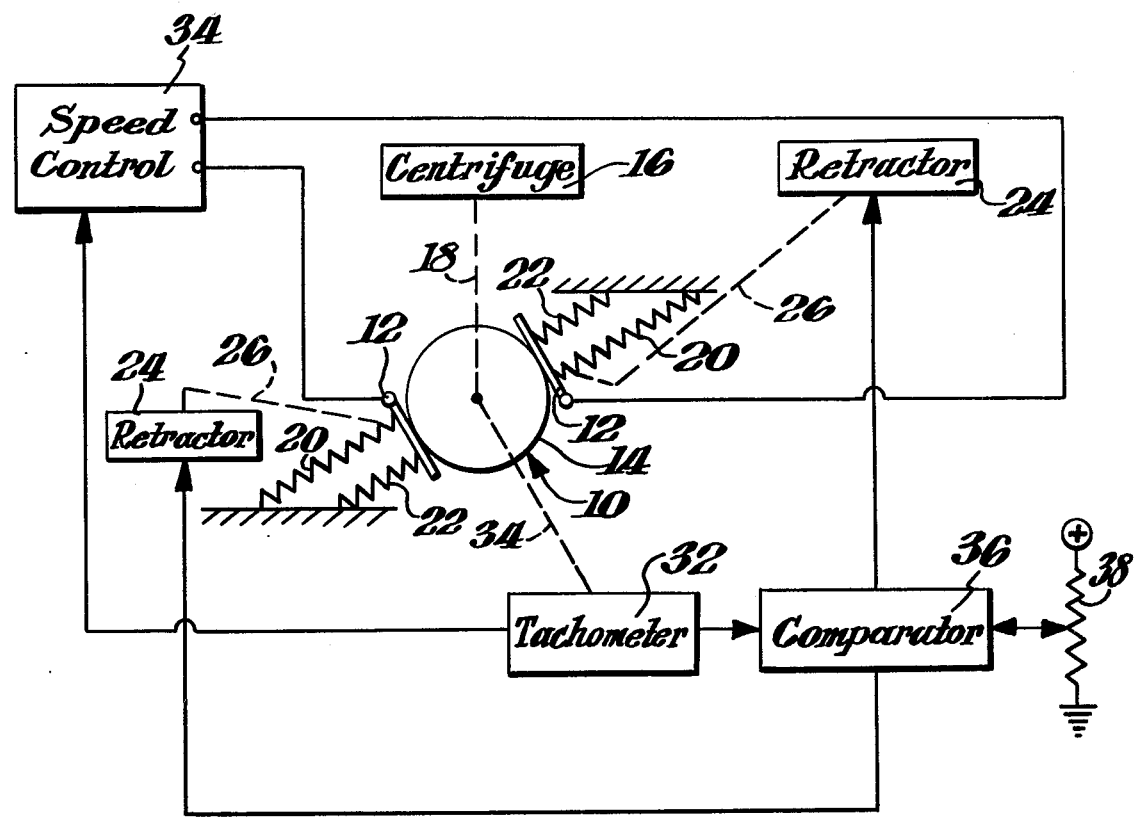
FIG. 1 is a partial block, partial diagrammatic representation of an apparatus constructed in accordance with a preferred embodiment of this invention.

The block diagram of FIG. 1 depicts a preferred apparatus for smoothing the acceleration and deceleration characteristics of an electric motor. The electric motor is depicted at 10 as having a pair of brushes 12 which bear against the commutator 14 (not specifically depicted) of the motor 10. The motor 10 may be a conventional series universal motor of a type, for example, typically used to drive centrifuges. A conventional centrifuge (rotor) is depicted by the block 16 and is driven by the motor 10 through a linkage depicted by the dashed line 18. This linkage 18 may, as is well known, be a drive belt, gearing, or a direct drive. The brushes 12 have a force applied to them such that they are urged against the commutator 14 with a predetermined pressure which is selected in accordance with well known motor design criteria.

In accordance with this invention, this force is applied in each case by a pair of springs, a stronger spring 20 and a weaker spring 22, i.e., the stronger spring 20 has a larger spring constant than the weaker spring 22. The springs are depicted diagramatically and may be compression type springs, coil springs, leaf springs, or any of the types that are conventionally used to apply pressure to the brushes of an electric motor. Both of the springs are secured to a fixed point. The stronger springs 20 are adapted to be withdrawn or retracted to prevent them from applying a force to the respective brushes 12 by retractors 24 acting through respective mechanical linkages depicted by the respective dashed lines 26.

These retractors may be any suitable device for lifting the stronger springs 20 away from contact with the brushes 12. The retractors 24 may be any suitable prime mover device capable of compressing or withdrawing the stronger springs 20 such that they do not apply a force to the brushes 12. Among such devices, for example, are electromagnets, pressure-operated diaphrams, such as depicted, for example, in U.S. Pat. No. 2,128,598, or cable operated devices such as depicted in U.S. Pat. No. 3,278,777.

In operation the operator initially prepares the centrifuge tubes (in the centrifuge application), places them in the centrifuge 16, and actuates the motor 10. Prior to actuating the motor 10, he energizes the retractors 24 such that the stronger springs 20 are withdrawn, leaving only the force of the weaker springs 22 to apply a force to the brushes. Typically, this weaker brush pressure or force is significantly less than that usually employed at normal operating speeds. For example, in a typical case for a 2 horsepower motor, a spring load of 20 ounces is employed. According to this invention, the spring load and hence brush pressure is reduced from the normal 20-ounce pressure to a much lower value, say a 2-ounce load, which is applied by the weak springs 22. This permits relatively smooth, continuous acceleration of the centrifuge, substantially free of the vagaries, non-uniformities, and other discontinuities which otherwise tend to occur during low speed operation due to brush pressure on the commutator.

Such smooth acceleration is particularly desirable and necessary in the case of density gradient separations where, in a preferred usage, the tubes are placed in a vertical rotor, i.e., one in which the tube axes are parallel to the rotational axis of the centrifuge. During acceleration a speed is reached at which the gradient reorients from the normal vertical gradient (along the tube axes) to a horizontal gradient (perpendicular to the spin axis). Once reorientation has occurred and the gradient is horizontal, the separation distance between the layers or bands of the reoriented gradient is quite small. Under these conditions, the centrifugal force applied to each layer is about the same and, because of the greater centrifugal force at the higher speeds, there is a decreased possibility of disruption to the gradient. As a result, any vagaries, non-uniformities and other discontinuities in the acceleration characteristic have less effect on the gradient. Brush pressure may now be increased and acceleration continued up to normal centrifuge operating speed with relatively little danger of disturbing the gradient. The spring retractors 24–26 are released when such speed is reached allowing the stronger springs 20 to apply normal brush pressure to the commutator.

During deceleration the reverse procedure is applied. The motor is allowed to decelerate until a speed somewhat just above that at which the gradient would reorient back to the vertical, typically 500–1000 rpm, is reached. At this point, the retractor 24–26 is actuated to again retract the stronger springs 20 allowing only the weaker springs 22 to apply pressure to the brushes 12. Under these conditions, the deceleration continues through the critical speed for gradient work until the centrifuge comes to a complete stop. The lower spring pressure with the resulting lower friction facilitates a smooth deceleration characteristic with a reduced deceleration rate. Actuation of the retractors 24 may be accomplished manually or automatically.

To complete the description of FIG. 1, an automatic control system for actuating the retractors 24 is depicted. This control system includes a tachometer generator 32 which is coupled to sense the motor speed by a mechanical linkage depicted by the dashed line 34. The tachometer generator 32 provides an output signal whose amplitude will vary in accordance with the speed of the motor. This signal is coupled both to a speed control circuit 34 and to a comparator 36. The speed control circuit 34 may be of a conventional type which programs the speed through an adjustable acceleration characteristic or through an adjustable deceleration characteristic and controls the operating speed at some preset value.

Typical of such speed control circuits for centrifuges is that described, for example, in U.S. Pat. No. 3,262,040, issued July 19, 1966 to A. L. Jackson et al. Another suitable speed control circuit is that described in U.S. Patent application Ser. No. 637,540, filed Dec. 3, 1975, now U.S. Pat. No. 4,096,422 issued June 20, 1978, to J. A. Fleming and C. T. Allen. The described speed control circuit receives the speed-related signal from the tachometer 32 and controls the duty cycle or current amplitude of the alternating current power that is supplied to the motor 10. Similarly, the comparator 36, which may be of any suitable type, receives a set signal such as that derived from a potentiometer 38. When the actual detected speed equals that represented by the set signal, an output signal is provided to both of the retractors 24 to cause them to retract or release the stronger spring 20 depending on whether the centrifuge is decelerating or accelerating.

Figure 3:
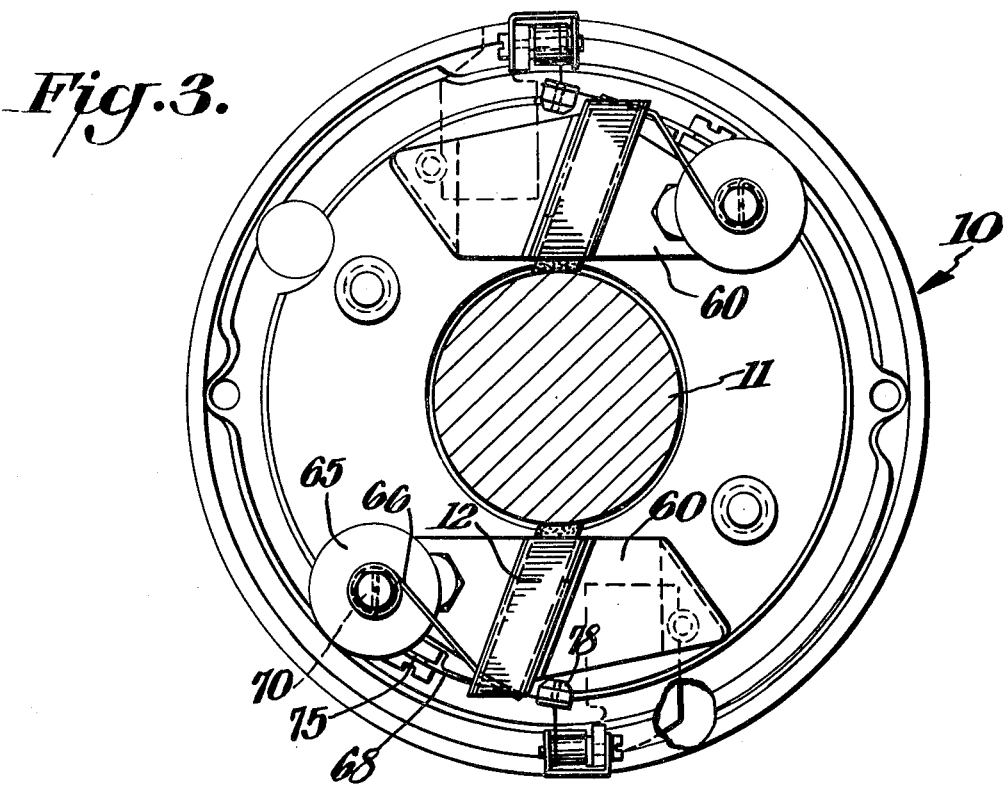
FIG. 3 is a plan view of the apparatus depicted in FIG. 2.
Figure 2:
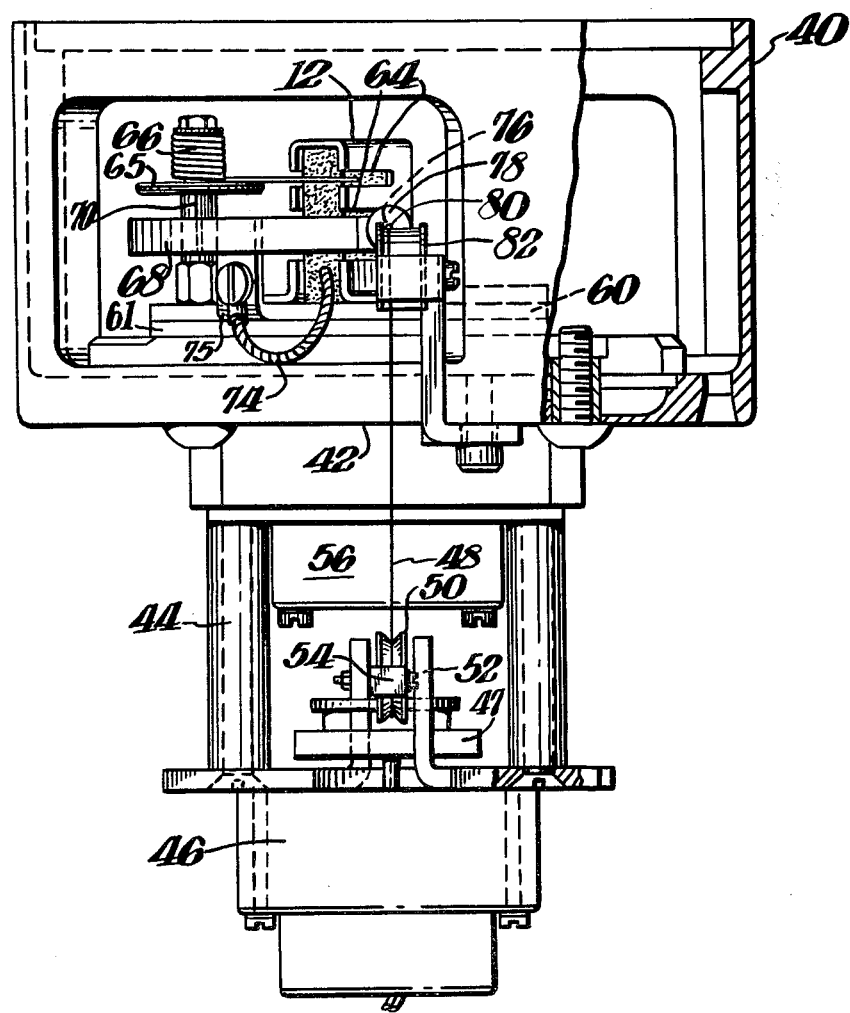
FIG. 2 is a side elevation view, partly cut away of a preferred embodiment of the apparatus that may be used to retract a brush spring, thereby to reduce the brush pressure on the commutator.

There is seen in FIGS. 2 and 3 a preferred embodiment of the invention which permits the double spring brush pressure to be applied to the commutator with provision for the retraction of the stronger spring when a retractor motor is actuated. In these figures there is seen a portion of the end bell housing 40 of a motor 10 (FIG. 3). Only a portion of the motor is shown, i.e., the commutator 11, for clarity of description. The housing 40 has an end face 42 to which is secured a frame 44 on which is mounted a synchronous gear motor 46. The gear motor 46 has built therein a gear train which permits the motor to be driven in one direction. A clutch mechanism releases the gear train so that the gear train may release its load, i.e., the motor may be turned in the opposite direction when released. A suitable motor of this type, for example, may be purchased from Bristol-Saybrook, Bristol, Conn., and is designated model No. 357-2-.27D-H. The gear train drives a capstan 47 on which is wound a pair of flexible cables 48. These cables 48 may be braided steel cables of conventional type. The cables are drawn across pulleys 50 disposed on opposite sides of the frame, the pulleys being mounted by respective mounting brackets 52 attached to the frame 44. The cable 48 is retained within the pulleys by suitable clips 54 secured to the mounting brackets.

In the upper portion (in the drawing) of the frame, a tachometer generator 56 is mounted such that it may be coupled to be directly driven by the armature of motor 10. Wires (not shown) from the tachometer generator may be coupled to the control circuitry of FIG. 1. The bell housing 40 includes formed sheet metal brush holders 60 (any other may be used as desired) which are secured to the inner face of the end plate 42 of the bell housing 40. The brush holders 60 permit the brushes 12 to engage the commutator 11 of the motor 10. The brush holders 60 slideably mount the brushes 12. The outside portion of each holder 60 has longitudinal slots 64 formed therein to accommodate the end of a wound spring 66 and the end of a leaf spring 68 in side-by-side relationship such that the ends of the springs bear against the outer end of the brush 12 to provide the desired brush pressure. The wound spring 66 is a relatively weak spring having a low spring constant such that the brushes will bear against the commutator with a low force, say 2 ounces, that will not cause appreciable friction. In contradistinction, the leaf spring 68 is a strong spring having a high spring constant sufficient to provide the additional force necessary for the brush pressure normally required for high speed operation the motor, 20 ounces for the motor described above. Both pairs of the springs 66 and 68 are mounted on respective spring mounting posts 70 which are secured to the plate 60. The plate 60 is electrically insulated from the housing 40 by an insulating plate 61. Actually the wound spring is wound on a mandrel 65 which is mounted on the spring mounting post 70.

The brushes are supplied with electrical power through conventional pigtail leads 74 connected to tabs 75 on the plates 60. The end of each leaf spring 68 is notched or slotted as at 76 to permit a retaining nut 78 to engage the spring. For this purpose, each retaining nut 78 has an annular recess adapted to engage its corresponding slot 76. A bore 80 in each nut 78 permits the cables 48 to be introduced therein and knotted so that they do not slip therethrough. Each cable in turn is threaded over respective insulating guide shoe 82 secured to the housing 40 which permits the cables to be redirected from a sense generally parallel the axis of the motor armature to a radial sense so that the leaf springs 68 may be withdrawn from the respective brushes.

In operation, when the retractor motor 46 and its clutch are energized, the capstan winds up the cables 48 causing them to lift the strong leaf springs 68 away from contact with the brush ends leaving only the spring pressure of the weaker springs 64 to bear against the brushes 12. Conversely, when the clutch of the retractor motor is de-energized, it releases the capstan so that the spring pressure of the leaf springs 68 cause the cable 48 to unwind from the capstan, allowing the stronger springs 68 to again contact the brush and apply normal brush pressure.

If this brush spring retractor system just described is utilized, it is desirable that the control circuit of FIG. 1 have a slight time delay after the deactuation of the retractor such that the speed control circuit does not apply additional power to the brushes until they have had time to settle. This time delay may be provided by any suitable means such as a one-shot multivibrator or a time delay relay (not shown).

In alternative embodiments of the invention, a single spring may be used for each brush. In this case, each spring mounting bracket (post 70 in the embodiment of FIGS. 2 & 3) would be adjustable or positionable (or rotatable) to vary the force applied by each particular spring to the brushes. This may be done in the case of a leaf spring by rotating the mounting base 70. This approach is not as desirable as the double spring approach since it sometimes can become necessary to provide a means for the springs to apply a constant force. The adjustment of spring position renders this sometimes difficult. Alternatively, the spring position may be varied by an air cylinder or diaphragm or a pneumatic cylinder or diaphragm. An electromagnetic acutation means may be substituted as the prime mover for applying the desired force.

In summary, the apparatus of this invention provides a smooth, simple method of reducing brush friction. When brush friction is reduced, the acceleration and deceleration characteristics of the motor may be made more repeatable and more uniform. This is particularly desirable in centrifuge work. In such application, the acceleration and deceleration characteristics must be relatively smooth and constant, particularly at the very low speed. The apparatus of this invention permits this.

We claim:

1. Apparatus for smoothing the acceleration and deceleration characteristics of an electric motor having a commutator and an associated brush and brush holder, said apparatus comprising:
   first means for urging said brush against said commutator with a force of a first value,
   adjusting means associated with said first means for adjusting said force to a second value less than said first value, and
   means responsive to the speed of said motor being less than a predetermined value for actuating said adjusting means to reduce said force from said first value to said second value, thereby to smooth the acceleration and deceleration characteristics of said motor at speeds less than said predetermined value.

2. The apparatus of claim 1 wherein said first means includes:
   a first spring having a first spring constant, and
   a second spring having a second spring constant less than said first spring constant, said adjusting means acting to prevent said first spring from urging said brush against said commutator.

3. The apparatus of claim 2 wherein said first spring is a leaf spring and said adjusting means includes a driven cable for lifting said leaf spring away from said brush.

4. The apparatus of claim 1 which also includes a centrifuge rotor adapted to be driven by said motor.

5. The apparatus of claim 4 wherein said first means includes:
   a first spring having a first spring constant, and
   a second spring having a second spring constant less than said first spring constant, said adjusting means acting to prevent said first spring from urging said brush against said commutator.

6. A method for smoothing the acceleration and deceleration characteristics of a speed controlled electric motor, having a commutator and associated brushes by:
   sensing the speed of said motor, and
   reducing the force with which said brushes bear against said commutator when said speed is below a predetermined value.

* * * * *